United States Patent [19]

Yousefzadeh

[11] Patent Number: 5,758,850
[45] Date of Patent: Jun. 2, 1998

[54] FINIAL ADAPTOR

[76] Inventor: Kamran Yousefzadeh, 1727 S. Bentley Ave. #201, Los Angeles, Calif. 90025

[21] Appl. No.: 683,259

[22] Filed: Jul. 18, 1996

[51] Int. Cl.[6] ................................................ F21V 17/00
[52] U.S. Cl. ................. 248/231.61; 362/457; 362/356; 362/444
[58] Field of Search ................ 248/221.11, 222.11, 248/222.12; 411/457, 469, 480; 362/351, 358, 457, 356, 444; 493/950

[56] References Cited

U.S. PATENT DOCUMENTS

| | | | |
|---|---|---|---|
| 2,176,644 | 10/1939 | Sladek | 248/221.11 |
| 2,520,795 | 8/1950 | Bramming | 248/222.12 X |
| 4,714,987 | 12/1987 | Dene | 362/358 X |
| 4,979,084 | 12/1990 | Krauthamer | 362/444 X |
| 5,613,772 | 3/1997 | Sawyer . | |

OTHER PUBLICATIONS

"Finial Adapter for Clip-On Lamp Shades".

*Primary Examiner*—Alvin C. Chin-shue
*Assistant Examiner*—Long Dinh Phan
*Attorney, Agent, or Firm*—Scot A. Reader

[57] ABSTRACT

Adaptors and devices for displaying decorative finials. The adaptors and devices of the invention include devices for engaging various table lamps and other utilitarian objects, including table lamps having clip-on lamp shades and European standard table lamps, to extend the visual benefits of decorative finials beyond the application of a single finial atop an American standard table lamp.

8 Claims, 7 Drawing Sheets

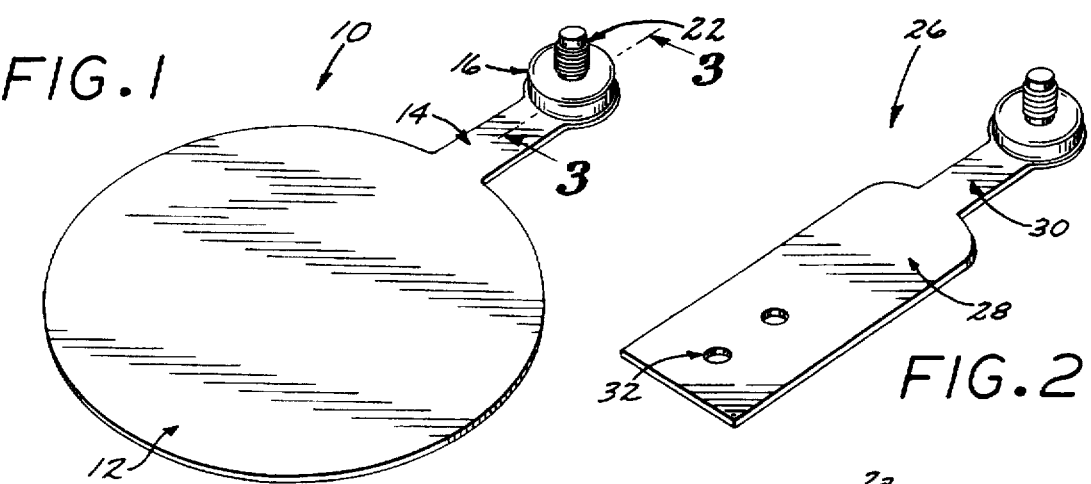
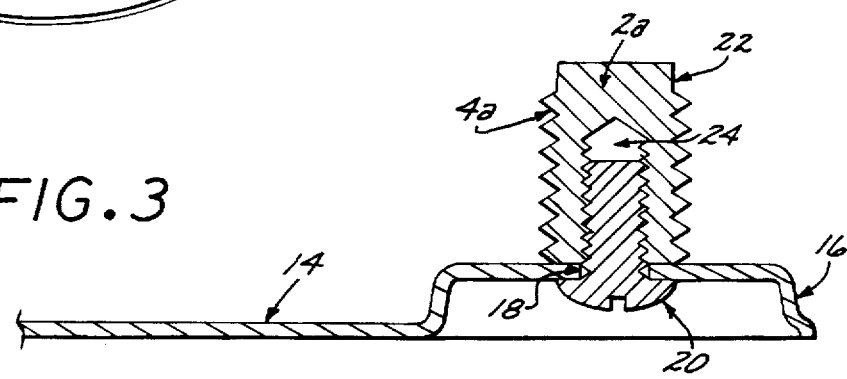
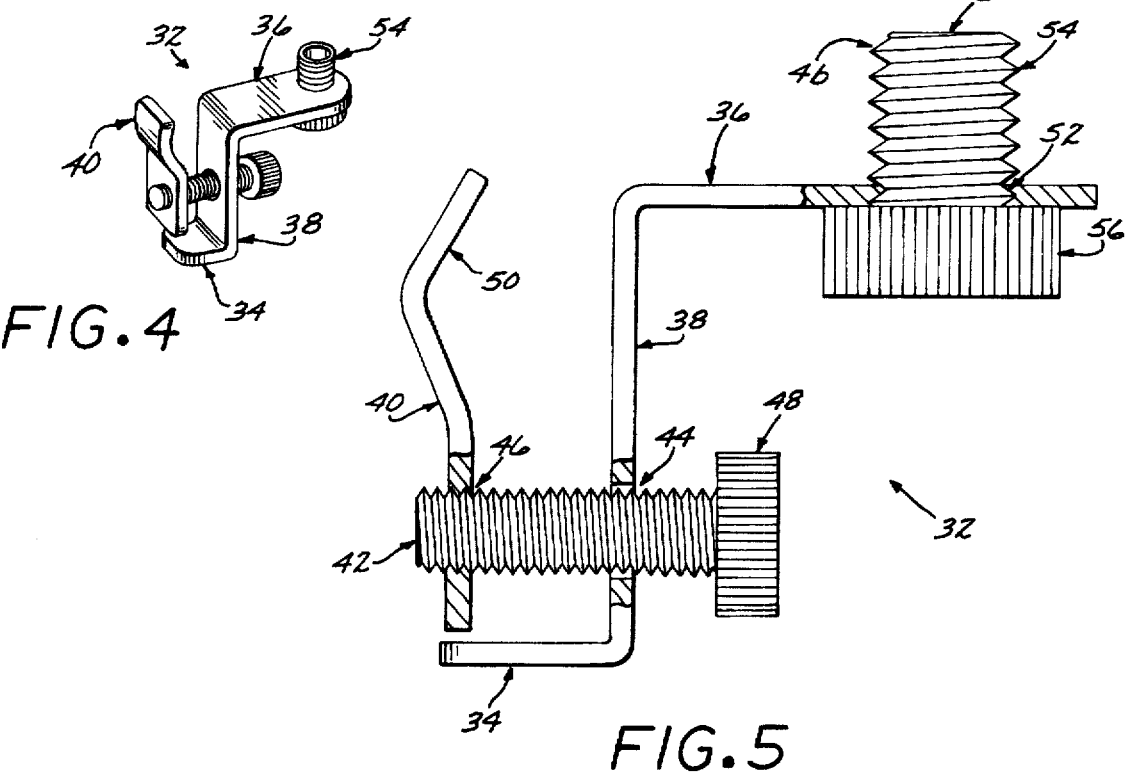

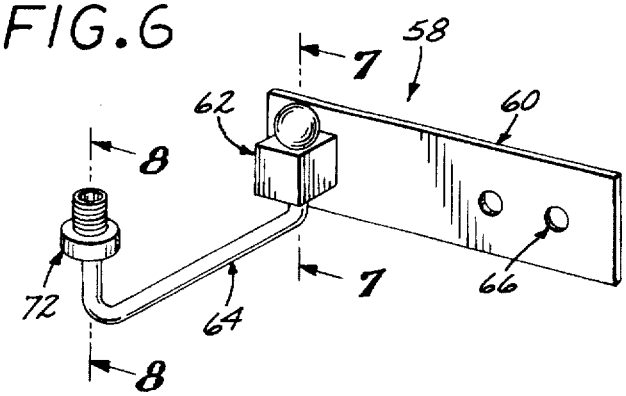
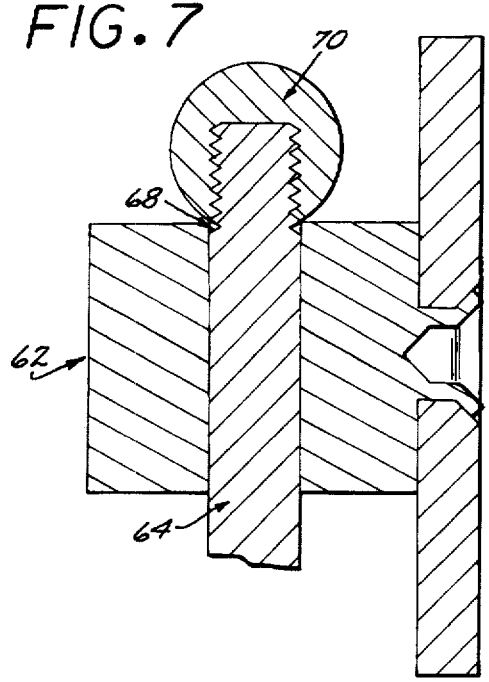
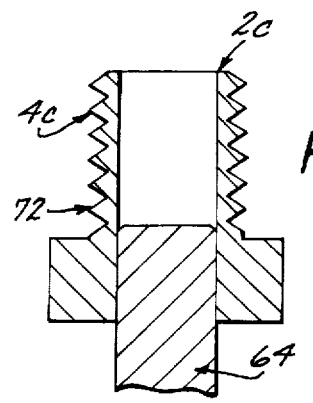
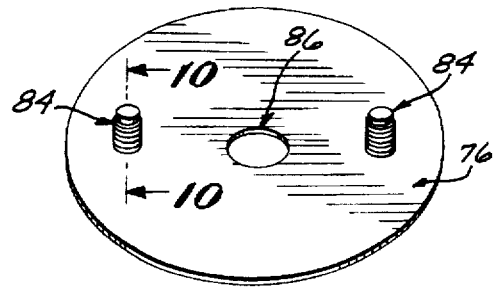
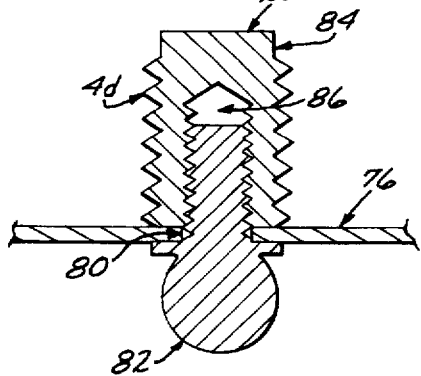
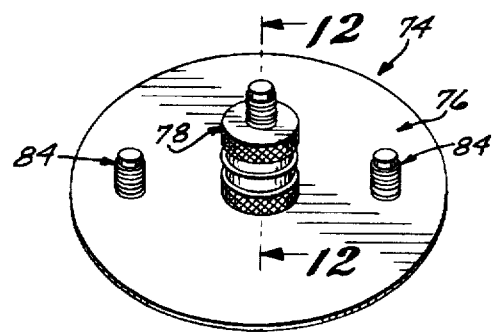

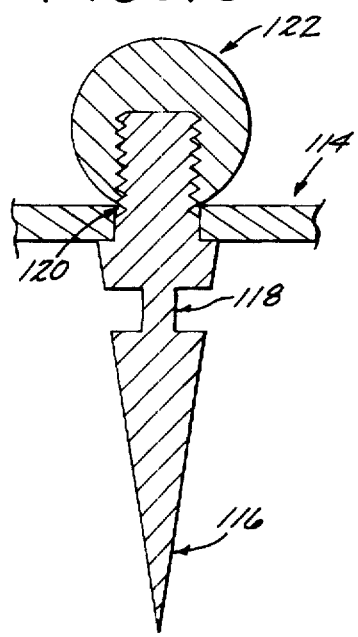
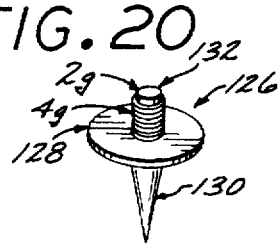
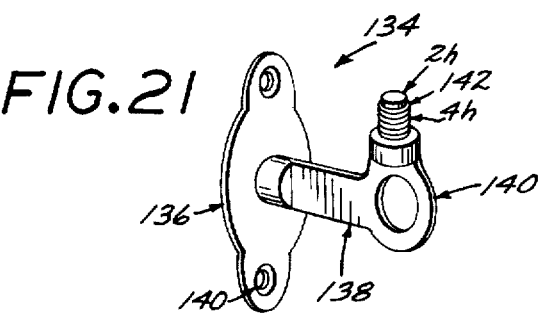
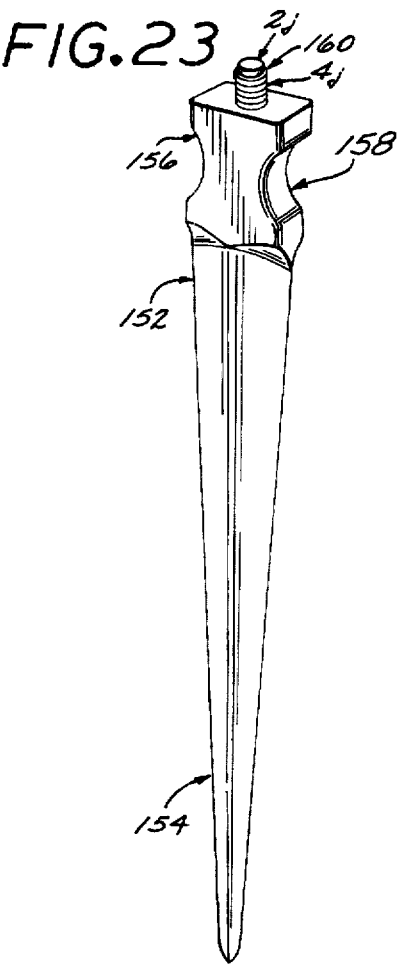
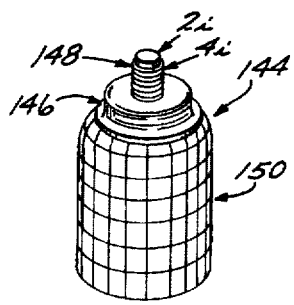
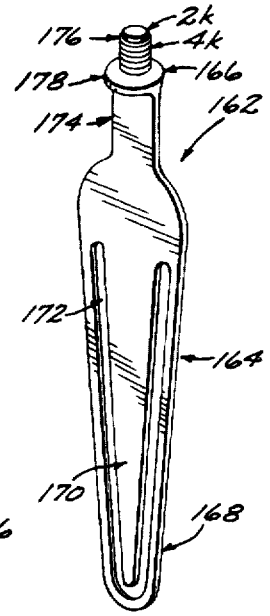
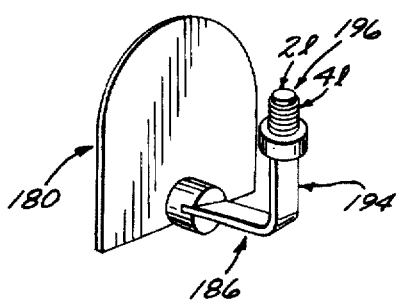

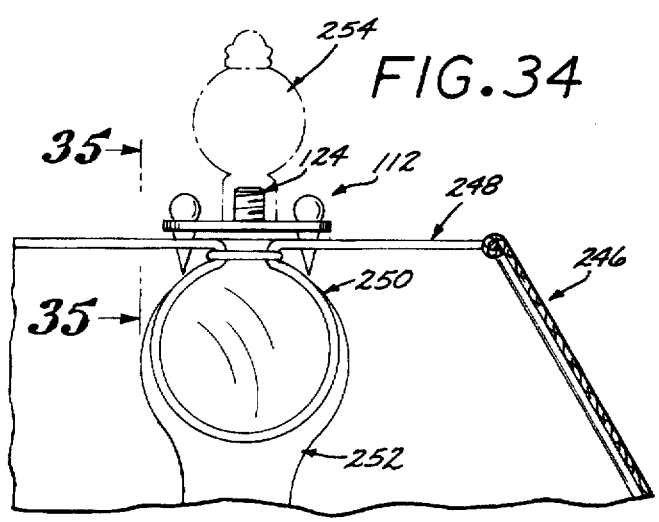
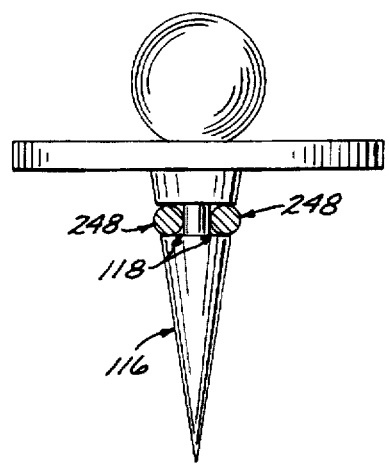
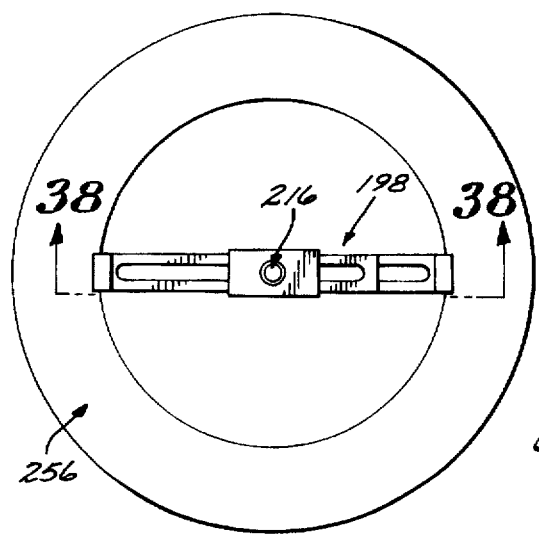
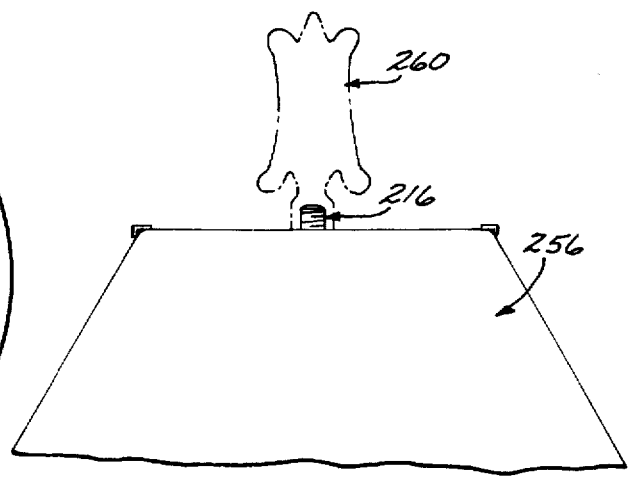
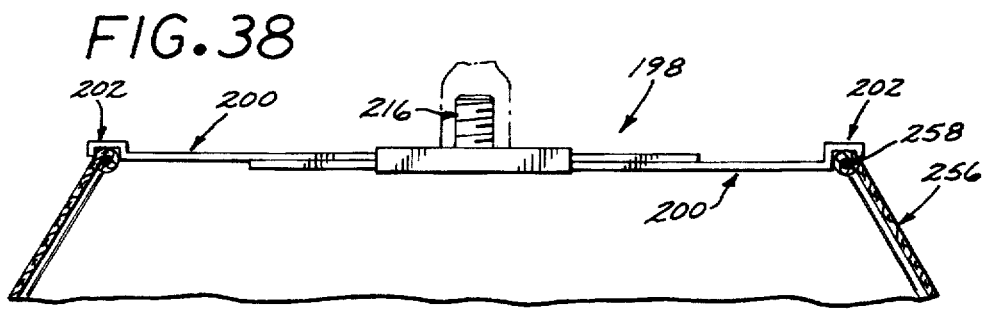

ns

FINIAL ADAPTOR

FIELD OF THE INVENTION

This invention relates to adaptors and devices for displaying decorative objects. More particularly, this invention relates to adaptors and devices for displaying finials.

BACKGROUND OF THE INVENTION

Finials are ornamental objects whose primary known use is to beautify table lamps. Finials include a decorative portion, which varies in design, and a bore having an internal thread for mating the finial with a finial receiver, also called a finial stud, of a table lamp. The decorative portion of finials is known to be designed and manufactured in many different sizes, shapes and styles, with each different design providing a unique visual appearance. In contrast, the bore of finials is generally of a common size so that the bore is compatible with most finial receivers, which typically have a size ¼"–27 external thread. Thus, the table lamp user is usually able to select a finial of a preferred size, shape and style from among a wide variety of ornamental designs.

It has long been known to use a single finial to beautify the top of an American standard table lamp. The base of such lamps typically has a harp extending upward from a lamp socket. Projecting upward from the top of the harp is a screw for receiving the center ring of a lamp shade. When the center ring is placed on the harp screw, the lamp shade becomes loosely suspended on the harp. The shade is then secured to the lamp base by mating the threaded bore of a finial with the harp screw and tightening down the finial until the center ring becomes fixed in place between the finial and the screw. After mating, the decorative portion of the finial remains visible above the lamp shade, creating an aesthetically pleasing visual impression. The finial thus helps secure the lamp shade to the lamp base while at the same time beautifying the top of the lamp.

While the visual benefits of finials are well known in the above-described application, the advantageous use of finials has been limited primarily to a single finial at the top of an American standard table lamp. Finials are not known to have been used to beautify other parts of American standard table lamps, such as the lamp shade and the bottom of the lamp base, as there is no ready means at those locations to attach a finial. Further, multiple finials are not known to have been displayed atop an American standard table lamp for added beautification, as the top of such lamps generally has only one harp screw for receiving a finial.

Moreover, finials are not known to have been displayed on table lamps designed in accordance with the European standard, because of differences in how the lamp shade is secured to the lamp base. In such table lamps, there is no harp extending upward from the lamp socket for receiving the lamp shade and finial. Instead, the lamp shade has a sunken center ring which is secured to the lamp base at the lamp socket.

Moreover, while finials have been displayed on table lamps having clip-on lamp shades, known devices to adapt such table lamps to receive a finial have certain disadvantages. In such table lamps, the lamp shade is secured to the lamp base using flexible wire clips, which grasp the light bulb mounted in the lamp socket. Known devices to adapt the wires of such lamp shades to receive a finial have proven difficult to install and often unable to maintain the finial in the desired upright position.

Moreover, the visual benefits of finials are not known to have extended to other utilitarian devices such as bookends, desktop phones, picture frames, candles, bottle tops, door knobs and electrical outlets, and have not extended to aesthetic devices, such as flower arrangements.

SUMMARY OF THE INVENTION

The present invention relates to adaptors and devices for extending the visual benefits of finials beyond the application of a single finial atop an American standard table lamp. The adaptors and devices have one or more finial receivers capable of displaying decorative finials.

In more detail, a universal adaptor for displaying a finial may be placed under any number of different utilitarian devices, such as a table lamp, a bookend or a desktop phone. The adaptor has a plate for placement under the device. An arm extending outward from the base plate of the adaptor has a finial receiver.

A lamp shade adaptor for displaying a finial is mountable on a lamp shade. The adaptor has a clamp for securing the adaptor to the lamp shade. A flange extending outward from the clamp has a finial receiver.

A picture frame adaptor for displaying a finial is mountable on a picture frame. The adaptor has a plate for mounting the adaptor to the back of a picture frame. An arm rotatably mounted in a joint attached to the back of the mounting plate has a finial receiver.

A multiple finial adaptor for displaying multiple finials is mountable atop an American standard table lamp. The adaptor has a plate mountable on the harp screw of the lamp. The plate has a plurality of finial receivers.

A wire-mounted adaptor for displaying a finial is mountable on a lamp having a clip-on lamp shade. Clip-on lamp shades are mounted to a lamp base using wire clips which extend inward from the top opening of a lamp shade and grasp the light bulb mounted in the lamp socket. The adaptor has a body with legs having notches for engaging the wires. The body has a finial receiver.

A tack adaptor for displaying a finial is mountable on any number of objects to which the adaptor may be tacked, such as a cork or candle. The head of the adaptor has a finial receiver.

A door pull for displaying a finial is mountable on a door, cabinet, or other household furniture which may be opened and shut. The finger-receiving portion of the door pull has a finial receiver.

A bottle cover for displaying a finial is mountable atop a beverage bottle. The cover has a finial receiver.

A letter opener for displaying a finial has a finial receiver at the end opposite the paper-cutting portion of the opener.

A bookmark for displaying a finial has a finial receiver at the portion of the bookmark extending from the book.

A safety plug for displaying a finial is mountable in an electrical outlet. The adaptor has an cover plate attached to the prongs which extend into the outlet. An arm extending from the cover plate has a finial receiver.

A flower finial may be used for displaying a finial in a flower arrangement. The flower finial has a stem with a finial receiver at the end.

An adjustable bridge adaptor for displaying a finial is mountable on a European standard table lamp or a table lamp having a clip-on lamp shade. The adaptor has dual hooks for securing the adaptor to opposite sides of the top opening of a lamp shade. Spanning the opening between the two hooks is an adjustable bridge. A clasp which holds upper and lower sections of the bridge together has a finial receiver.

3

Thus, the present invention offers unique adaptors and devices for displaying finials. The above and other objects and advantages will become apparent from the following more detailed description of the invention, taken in conjunction with the drawings.

BRIEF DESCRIPTION OF THE DRAWINGS

FIG. 1 is a perspective view of a first embodied universal finial adaptor, for placement under a utilitarian device having a generally circular cross-section, such as a table lamp;

FIG. 2 is a perspective view of a second embodied universal finial adaptor, for mounting under a utilitarian device having a generally rectangular cross-section, such as a desktop phone;

FIG. 3 is an enlarged cross-sectional view of the arm of the universal finial adaptor of FIG. 1, taken at 3—3;

FIG. 4 is a perspective view of a lamp shade finial adaptor, for mounting on a lamp shade;

FIG. 5 is a detailed side cross-sectional view of the lamp shade finial adaptor of FIG. 4;

FIG. 6 is a perspective view of a picture frame finial adaptor, for mounting to the back of a picture frame;

FIG. 7 is an enlarged cross-sectional view of the joint of the picture frame finial adaptor of FIG. 6, taken at 7—7;

FIG. 8 is an enlarged cross-sectional view of the finial receiver of the picture frame finial adaptor of FIG. 7, taken at 8—8;

FIG. 9 is a perspective view of the plate of a first embodied multiple finial adaptor, for mounting on the harp screw of an American standard table lamp;

FIG. 10 is an enlarged cross-sectional view of a finial receiver of the multiple finial adaptor of FIG. 9, taken at 10—10;

FIG. 11 is a perspective view of the first embodied multiple finial adaptor, shown with a finial-receiving center piece for securing the plate on the harp screw;

FIG. 19 is an enlarged cross-sectional view of the wire-mounted finial adaptor of FIG. 18, taken at 19—19;

FIG. 20 is a perspective view of a finial-receiving tack adaptor, for tacking on a utilitarian device, such as a cork or a candle;

FIG. 21 is a perspective view of a finial-receiving door pull, for mounting on a door, cabinet, or other household furniture which may be opened and shut;

FIG. 22 is a perspective view of a finial-receiving bottle cover, for mounting on a beverage bottle;

FIG. 23 is a perspective view of a finial-receiving letter opener;

4

Figure 17:
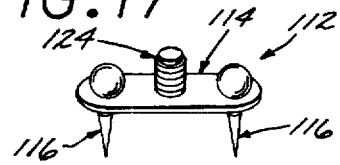
FIG. 17 is a perspective view of a wire-mounted finial adaptor, for engaging the wires of a clip-on lamp shade.
Figure 26:
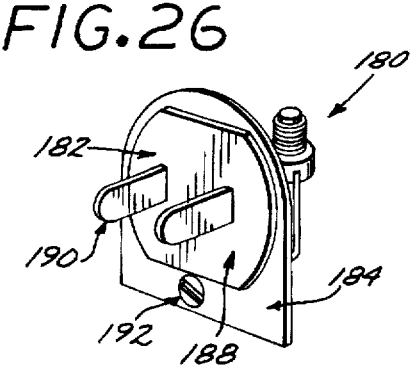
Figure 27:
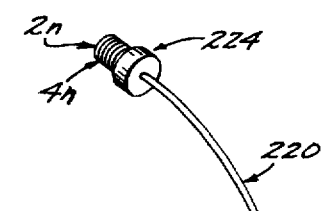
Figure 28:
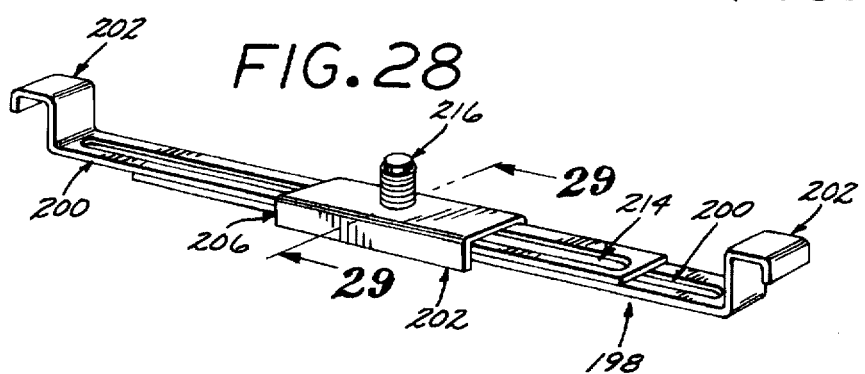
Figure 29:
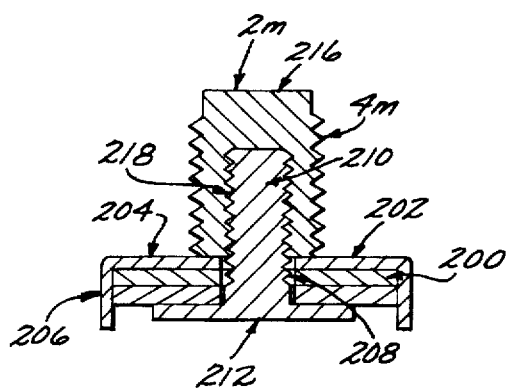
Figure 30:
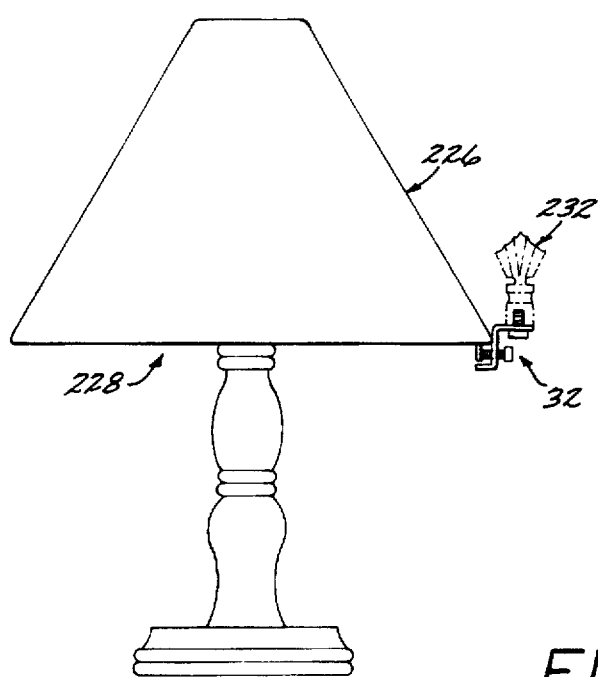
Figure 31:
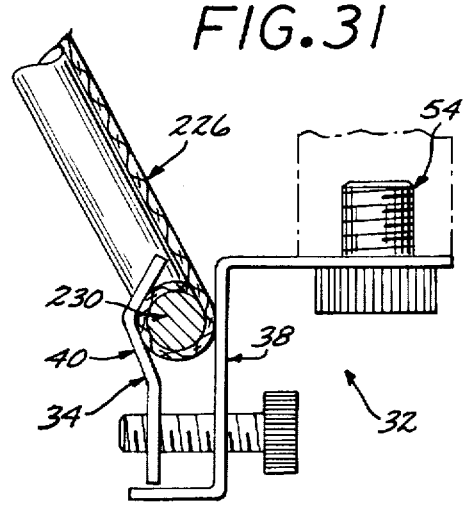
Figure 32:
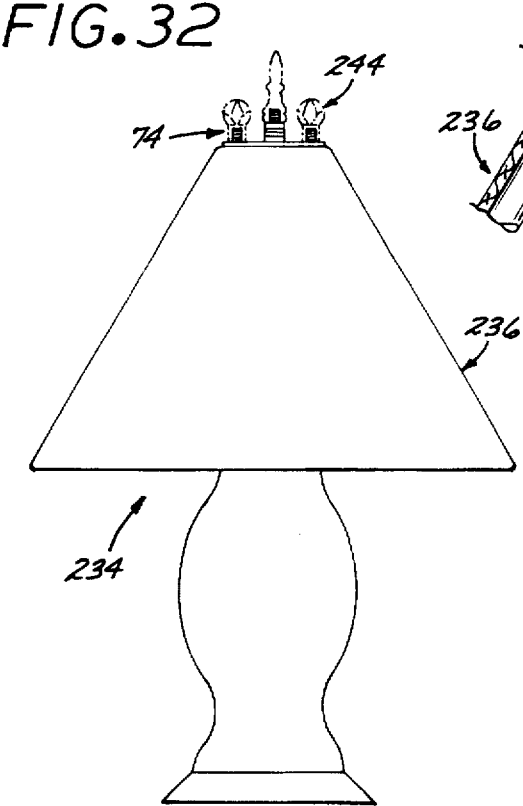
Figure 33:
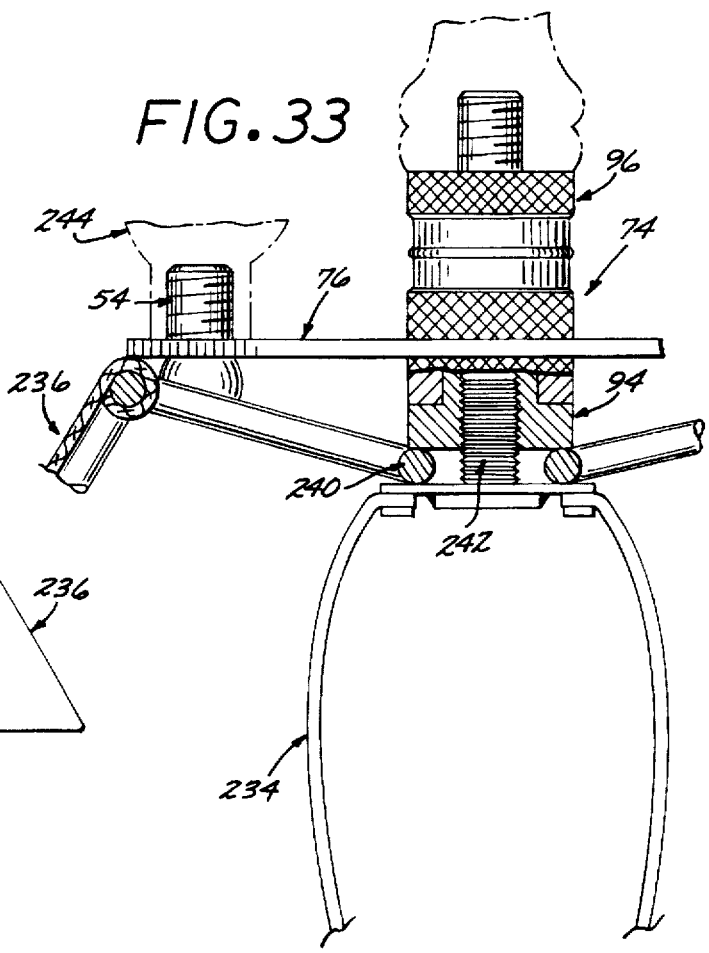

FIG. 24 is a perspective view of a finial-receiving bookmark;

FIG. 25 is a front perspective view of a finial-receiving safety plug, for mounting in an electrical outlet;

FIG. 26 is a rear perspective view of the finial-receiving safety plug of FIG. 26;

FIG. 27 is a perspective view of a flower finial;

FIG. 28 is a perspective view of an adjustable bridge finial adaptor, for mounting on a European standard table lamp or a clip-on lamp shade;

FIG. 29 is a enlarged cross-sectional view of the clasped section of the adjustable bridge finial adaptor of FIG. 28, taken at 29—29;

FIG. 30 is a side view of a table lamp illustrating the lamp shade finial adaptor of FIG. 4 with a finial mounted thereon;

FIG. 31 is an enlarged fragmentary view of the lamp shade of the table lamp and finial adaptor shown in FIG. 30;

FIG. 32 is an American standard table lamp illustrating the first embodied multiple finial adaptor of FIG. 11 with a finial mounted thereon;

FIG. 33 is an enlarged fragmentary view of the upper portion of the American standard table lamp and multiple finial adaptor shown in FIG. 32;

FIG. 34 is the upper portion of a clip-on table lamp illustrating the wire-mounted finial adaptor of FIG. 17 with a finial mounted thereon;

FIG. 35 is an enlarged fragmentary view of the lamp shade wires of the table lamp and wire-mounted finial adaptor shown in FIG. 34;

FIG. 36 is a top view of a table lamp illustrating the adjustable bridge adaptor of FIG. 28;

FIG. 37 is a side view of the table lamp and adjustable bridge adaptor shown in FIG. 36 with a finial mounted on the bridge finial adaptor; and FIG. 38 is an enlarged fragmentary view of the upper portion of the lamp shade of the table lamp and adjustable bridge adaptor shown in FIG. 36.

DESCRIPTION OF THE PREFERRED EMBODIMENTS

In the drawings, FIGS. 1 to 38, demonstrating various preferred embodiments, finial receivers 22, 54, 72, 84, 96, 124, 132, 142, 148, 160, 176, 196, 216 and 224 each preferably include a generally cylindrical threaded portion $2a$, $2b$, $2c$, $2d$, $2e$, $2f$, $2g$, $2h$, $2i$, $2j$, $2k$, $2l$, $2m$ and $2n$, respectively, having an uninterrupted size ¼"–27 external thread $4a$, $4b$, $4c$, $4d$, $4e$, $4f$, $4g$, $4h$, $4i$, $4j$, $4k$, $4l$, $4m$ and $4n$, respectively, for coupling with the bore of a finial. It will be readily appreciated that a finial is mountable on finial receivers 22, 54, 72, 84, 96, 124, 132, 142, 148, 160, 176, 196, 216 or 224 by placing the bore of the finial on threaded portion $2a$, $2b$, $2c$, $2d$, $2e$, $2f$, $2g$, $2h$, $2i$, $2j$, $2k$, $2l$ or $2m$ of finial receiver 22, 54, 72, 84, 96, 124, 132, 142, 148, 160, 176, 196, 216 or 224 and twisting the finial in the clockwise direction until threaded engagement of the finial on the receiver 22, 54, 72, 84, 96, 124, 132, 142, 148, 160, 176, 196, 216 or 224 is achieved. All referenced components in FIGS. 1 to 29 are preferably made of brass, unless otherwise specified.

Turning now to particular drawings, FIGS. 1 and 3 show a preferred embodiment of a universal finial adaptor 10 for placement under a device having generally circular cross-section, such as a table lamp. Adaptor 10 has circular base plate 12 and an arm 14 extending outward from base plate 12. At the end of arm 14 is elevated section 16. Elevated section 16 has a center hole 18 for receiving screw 20 upward through hole 18 for mating with finial receiver 22. Finial receiver 22 is generally cylindrical and has internal threaded bore 24 for engaging screw 20.

Turning now to FIG. 2, another preferred universal finial adaptor 26 for placement under a device having a generally rectangular cross-section, such as a desktop phone, is shown. Adaptor 26 has generally rectangular base plate 28 and arm 30 extending outward from plate 28. Plate 28 has holes 32 for receiving screws (not shown) for mounting plate 28 to the device to which the adaptor 26 may be mounted. Arm 30 of adaptor 26 is preferably identical in structural design to arm 14 shown in FIGS. 1 and 3 and heretofore described.

Turning now to FIGS. 4 and 5, in another preferred embodiment of the invention, a lamp shade finial adaptor 32 has a clamp 34 for securing adaptor 32 to the bottom of a lamp shade, and a flange 36 for receiving and displaying a finial outside lamp shade. Clamp 34 has outer plate 38 and inner plate 40 joined by clamp screw 42. Outer plate 38 and inner plate 40 have threaded holes 44 and 46, respectively, for receiving clamp screw 42. Clamp 34 is secured on lamp shade by placing lamp shade between outer plate 38 and inner plate 40 and twisting clamp screw 42 sequentially through holes 44 and 46 in outer plate 38 and inner plate 40. Width of clamp 34 may be adjusted by varying travel distance of clamp screw 42 through outer plate 38 before engaging screw 42 with inner plate 40. Clamp screw 42 has knurling on head 48 to facilitate manipulation of screw 42 by hand. Inner plate 40 has bend 50 to provide better frictional fit of lamp shade within clamp 34. Flange 36 extends outward from outer plate 38. Near outer end of flange 36 is threaded hole 52 for receiving finial receiver 54 upward through hole 52. Finial receiver 54 has knurled head 56 and is adapted to receive a finial.

Turning to FIGS. 6-8, a preferred embodiment of the picture frame adaptor 58 of the invention has a mounting plate 60, a joint 62 and a swing arm 64. The mounting plate 60 is a generally rectangular plate having holes 66 for receiving screws for mounting plate 60 to the back of a picture frame. Mounted to back of plate 60 near one end is joint 62. Joint 62 has a slot 68 for receiving swing arm 64. Arm 64 is generally U-shaped. Threaded end of arm 64 extends slidably upward through slot 68. Arm 64 is rotatably mounted in joint 62 by screwing cap 70 having outer diameter larger than slot 68 on threaded end of arm 64. Frictionally mounted at other end of arm 64 is finial receiver 72.

Turning to FIGS. 9-12 and 14 a preferred embodiment of the multiple finial adaptor 74 of the invention has a circular plate 76 adapted to receive two finials and a finial-receiving center piece 78 adapted to receive a third finial. Plate 76 has holes 80 spaced uniformly from center piece 78 for accommodating screws 82 for mating with finial receivers 84, and a center hole 86 for mounting adaptor 74 on the harp extending from the lamp socket of an American standard table lamp (not shown). Screws 82 project upward through holes 80. Finial receivers 84 have internal threaded bores 86 for mating with screws 82. Finial-receiving center piece 78 includes a harp screw receiver 94 and a center finial receiver 96. Harp screw receiver 94 has an internal threaded bore 98 for mating with the harp screw projecting upward from the harp of an American standard table lamp. Upper end of harp screw receiver 94 projects upward through center hole 86. Center finial receiver 96 has an internal threaded bore 90 for coupling with external threads 100 of harp screw receiver 94.

Figure 12:
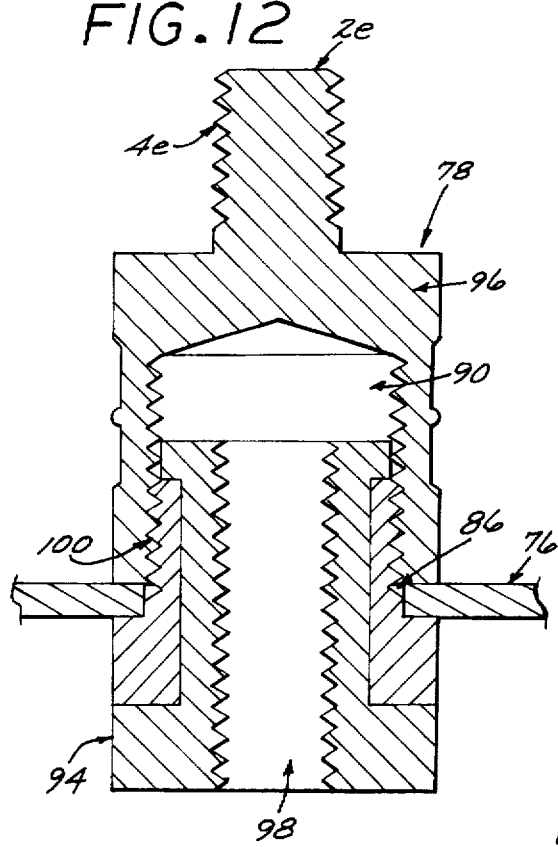
FIG. 12 is an enlarged cross-sectional view of the finial-receiving center piece of FIG. 11, taken at 12—12.
Figure 13:
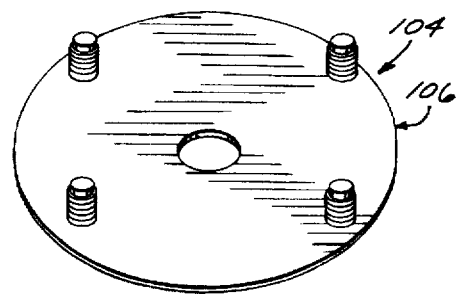
FIG. 13 is a perspective view of a second embodied multiple finial adaptor, for mounting on the harp screw of an American standard table lamp.
Figure 14:
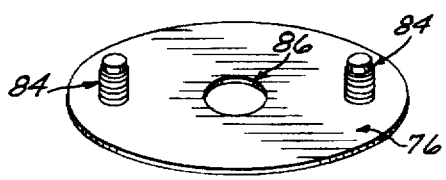
FIG. 14 is another perspective view of the plate of the first embodied multiple finial adaptor.

Turning to FIG. 13, another preferred multiple finial adaptor 104 shown without a center piece has a plate 106 adapted to receive four finials.

Figure 15:
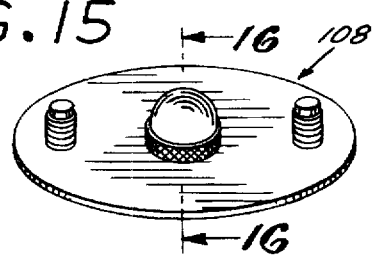
FIG. 15 is a perspective view of the first embodied multiple finial adaptor, shown with an alternative center piece for securing the plate on the harp screw.
Figure 16:
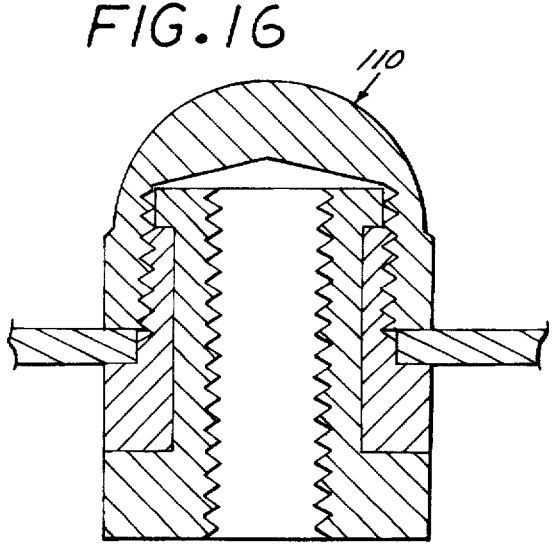
FIG. 16 is an enlarged cross-sectional view of the alternative center piece of FIG. 15, taken at 16—16.

Turning to FIGS. 15 and 16, another preferred embodiment of the multiple finial adaptor 108 of the invention has an alternative hemispherical center piece 110 which is not adapted to receive a finial.

Figure 18:
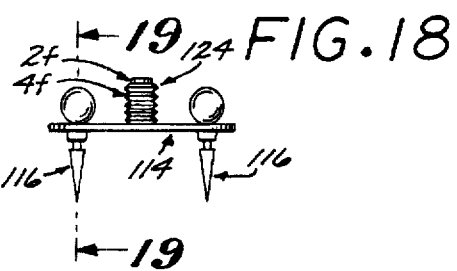
FIG. 18 is a side view of the wire-mounted finial adaptor of FIG. 17.

Turning now to FIGS. 17-19, a preferred embodiment of a wire-mounted finial adaptor 112 is shown. Adaptor has a body 114 with legs 116 at each end. Legs 116 have notches 118 for frictional engagement with wires extending inward from the top opening of a clip-on lamp shade. Body 114 has holes 120. Threaded end of legs 116 projects upward through holes 120. Legs 116 are secured to body 114 by screwing cap 122 having outer diameter larger than holes 120 onto threaded end of legs 116. Finial receiver 124 is mounted atop body 114.

Turning to FIG. 20, a preferred tack adaptor 126 for tacking on a utilitarian device, such as a cork or a candle, is shown. Tack adaptor 126 has a head 128 and a spike 130 for tacking into device. A finial receiver 132 is mounted atop head 128.

Turning to FIG. 21, in yet another preferred embodiment of the invention, a door pull 134 has a mounting plate 136 and a finger key 138. Plate 136 has holes 140 for receiving screws for mounting plate 136 to a door, cabinet or other household furniture (not shown). Extending outward from plate 136 is finger key 138. At end opposite plate 136, key 138 has finger ring 140 adapted to receive human fingers. Finial receiver 142 is mounted atop finger ring 140.

Turning to FIG. 22, in a preferred embodiment of the invention, a bottle cover 144 for displaying a finial atop a bottle is shown. Cover 144 has a generally circular base 146. Base 146 has a finial receiver 148. Wire mesh 150 for stabilizing base 146 on bottle drapes down circumferentially from base 146.

Turning to FIG. 23, a preferred letter opener 152 for displaying a finial has a paper-cutting portion 154 and a finial-receiving portion 156. Finial-receiving portion 156 has a handle 158 and a finial receiver 160.

Turning to FIG. 24, a preferred bookmark 162 for displaying a finial has a marker portion 164 and a finial-receiving portion 166. Border 168 of marker portion 164 is separated from interior 170 by perforation 172, which allows for simultaneous marking of multiple pages of a book. Finial-receiving portion 166 includes arm 174 having finial receiver 176 at end of finial-receiving portion 166 and accompanying base 178.

Turning to FIGS. 25 and 26, in yet another preferred embodiment of the invention, a safety plug 180 for displaying a finial includes a plug section 182, a base plate 184 and a display section 186. Plug section 182 includes safety plate 188 and prongs 190 for plugging into an electrical outlet. Plug section 182 is preferably made of plastic. Safety plate 188 is preferably glued to back of base plate 184. Screw 192 extends through back of base plate 184 to secure display section 186 to base plate 184. Display section 182 includes arm 194 extending from front of base plate 184. At end of arm 194 is finial receiver 196.

Turning to FIGS. 28 and 29, in a preferred embodiment, an adjustable bridge finial adaptor 198 for displaying a finial on a European standard table lamp or lamp having a clip-on lamp shade is shown. Adaptor 198 has opposite facing extension plates 200. Each plate 200 has a hook 202 at one end for mounting plate 200 on one side of the upper rim of a lamp shade. Plates 200 are placed atop one another in opposite facing directions to span the top opening of the lamp shade. Plates 200 are held in engagement by clasp 202. Clasp 202 includes clasp plate 204 having flanges 206 at each end and center hole 208. Flanges 206 help keep plates 200 in lateral alignment. The body of a screw 210 having head 212 of substantially larger diameter than width of plate slots 214 projects upward through slots 214 of opposite facing plates 200 and through center hole 208 of clasp 202. Finial receiver 216 has internal threaded bore 218 for mating with screw 210. Plates 200 are secured in place atop lamp shade by twisting finial receiver 216 onto screw 210 until receiver 216 is firmly secured to clasp 202.

Turning to FIG. 27, a preferred flower finial 220 is shown. Flower finial 220 has stem 222 and finial receiver 224 at end of stem 222.

In FIGS. 30 through 38, preferred embodiments of the invention are demonstrated in relation to table lamps. In FIGS. 30 and 31, the preferred lamp shade finial adaptor 32 is shown clamped to the lamp shade 226 of a table lamp 228. Lower support wire 230 runs circumferentially around bottom of shade 226 and is frictionally secured in clamp 34 between outer plate 38 and inner plate 40. Finial 232 is mounted on finial receiver 54.

In FIGS. 32 and 33, the first preferred multiple finial adaptor 74 is shown mounted atop an American standard table lamp 234. Lamp 234 has a lamp shade 236 and a harp 238. Lamp shade 236 has center ring 240 suspended on harp 238. Harp screw 242 projects upward from harp 238 through center ring 240. Multiple finial adaptor 74 is secured in place atop the lamp shade 236 by turning center finial receiver 96 in the clockwise direction until plate 76 becomes securely fixed between center finial receiver 96 and harp screw receiver 94 and harp screw receiver 94 becomes threadably engaged with harp screw 242. Finials 244 are mounted on finial receivers 84.

In FIGS. 34 and 35, the preferred wire-mounted finial adaptor 112 is shown mounted to a clip-on lamp shade 246. Lamp shade 246 has dual wires 248 extending inward from upper rim of shade 246. Wires 248 separate near center of shade 246 to form clip 250 for grasping light bulb 252. Legs 116 of adaptor 112 are slid downward between wires 248 until wires 248 become secured in notches 118 of legs 116. Finial 254 is mounted on finial receiver 124.

In FIGS. 36–38, the preferred adjustable bridge adaptor 198 is shown mounted on a lamp shade 256. Upper support wire 258 runs circumferentially around upper rim of shade 256. Plates 200 are longitudinally adjusted to align hooks 202 with diametrically opposite ends of support wire 258. Finial 260 is mounted on finial receiver 216.

It will be apparent from the foregoing that, while particular forms of the invention have been illustrated and described, various modifications can be made without departing from the scope and spirit of the invention. Accordingly, it is not intended that the invention be limited except by the appended claims.

What is claimed is:

1. A wire-mounted finial adaptor, comprising: a body;
   at least two legs projecting downward from said body, each leg having a notch for securing said leg to a wire;
   a finial receiver on said body, said finial receiver comprising a generally cylindrical threaded portion; and wherein said body has a hole and each leg has a threaded end and a cap, the hole receiving the threaded end of said leg, and the cap engaging the threaded end of said leg.

2. The adaptor according to claim 1, wherein the threaded portion has a size ¼"–27 external thread.

3. An engaging means for securing to a lamp shade, wherein the lamp shade has two parallel wires in close proximity extending diametrically inward from the upper rim of the lamp shade, said engaging means comprising:
   a body;
   at least two legs projecting from one side of said body, each leg having a notched portion for engaging the parallel wires between the parallel wires; and wherein said body has a hole and each leg has a threaded end and a cap, the hole receiving the threaded end of said leg, and the cap engaging the threaded end of said leg.

4. The engaging means according to claim 3, wherein said legs are slidably engageable between the parallel wires.

5. The engaging means according to claim 3, wherein said legs are generally conical.

6. The engaging means according to claim 3, wherein the notched portion is a single notch running circumferentially around said leg.

7. The engaging means according to claim 3, wherein said engaging means and the parallel wires are held in generally rigid retention when engaged at the notched portions of said legs.

8. The engaging means according to claim 3, wherein the notched portions are formed separate and apart from said body.

* * * * *